(12) United States Patent
Boisseau

(10) Patent No.: US 8,172,046 B2
(45) Date of Patent: May 8, 2012

(54) DISC BRAKE DEVICE TO KEEP A VEHICLE STATIONARY WHEN PARKED

(75) Inventor: Jean-Pierre Boisseau, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 619 days.

(21) Appl. No.: 12/359,006

(22) Filed: Jan. 23, 2009

(65) Prior Publication Data
US 2009/0188760 A1 Jul. 30, 2009

(30) Foreign Application Priority Data
Jan. 25, 2008 (FR) ...................................... 08 00413

(51) Int. Cl.
F16F 55/18 (2006.01)
(52) U.S. Cl. ....................... 188/72.2; 188/70 B; 188/265
(58) Field of Classification Search ................ 188/70 B, 188/70 R, 106 F, 72.2, 72.4, 72.6, 72.7, 265, 188/370; F16D 65/04, 55/18
See application file for complete search history.

(56) References Cited

U.S. PATENT DOCUMENTS

| 3,743,060 | A | | 7/1973 | Hendrickson | |
|---|---|---|---|---|---|
| 3,800,920 | A | | 4/1974 | Warwick | |
| 3,874,747 | A | * | 4/1975 | Case et al. | 303/89 |
| 4,007,815 | A | * | 2/1977 | Acre | 188/265 |
| 5,954,162 | A | * | 9/1999 | Feigel et al. | 188/72.6 |
| 7,188,710 | B2 | * | 3/2007 | Reuter et al. | 188/72.7 |
| 7,364,021 | B2 | * | 4/2008 | Baumann et al. | 188/72.7 |
| 7,458,445 | B2 | * | 12/2008 | Inagaki et al. | 188/72.7 |
| 7,497,306 | B2 | * | 3/2009 | Severinsson | 188/72.2 |
| 7,779,972 | B2 | * | 8/2010 | Inagaki et al. | 188/265 |
| 2005/0247527 | A1 | * | 11/2005 | Severinsson | 188/72.2 |
| 2007/0193838 | A1 | * | 8/2007 | Inagaki et al. | 188/265 |

FOREIGN PATENT DOCUMENTS

DE 3015838 10/1981
WO 2005005853 1/2005

OTHER PUBLICATIONS

FR 08 00413 Search Report and Written Opinion, 5 pages.

* cited by examiner

Primary Examiner — Bradley King
Assistant Examiner — Thomas Irvin
(74) Attorney, Agent, or Firm — Michael Best & Friedrich LLP

(57) ABSTRACT

The disc brake device comprises a piston (5) designed to press a pad (8) against a disc (2) when said piston is subjected to a first force along a first axis (z'z) in a direction directed from the piston toward the pad. A first plate (12, 13) is inserted between a first surface (52) of the piston (5) and the pad (8) and designed to generate a second force along the first axis (z'z) in a direction directed from the pad toward the piston when the pad (8) is caused to move as a result of rotation of the disc (2.

20 Claims, 6 Drawing Sheets

DISC BRAKE DEVICE TO KEEP A VEHICLE STATIONARY WHEN PARKED

BACKGROUND AND SUMMARY OF THE INVENTION

The present invention relates to a disc brake device for keeping a vehicle stationary when parked.

Disc brake devices for keeping vehicles stationary when parked are already known, these being, for example, such as those described in Document WO02/44582. An arm, which pivots under the action of a cable connected to the handbrake, causes a mobile plate to pivot in such a way as to push it toward the brake disc.

Such devices are not designed to apply the parking brake by depressing the service brake pedal, in other words by using hydraulic fluid rather than a cable or some other mechanical means.

The use of a hydraulic fluid to apply a parking brake presents a number of difficulties which stem from the expansion of the parts when applied hot. Document U.S. Pat. No. 6,659,236 proposes to overcome these difficulties by means of a spring which gradually relaxes as the system cools. It then becomes necessary to add, to the fluid pressure customary in applying the brake, an additional pressure for compressing the spring so that the relaxed spring continues to apply a force of a same order of magnitude as that obtained with a customary fluid pressure at the time of brake application. This additional pressure means that the hydraulic circuit has to be over-engineered.

In order to remedy the disadvantages of the known art, the subject of the invention is a disc brake device comprising a piston designed to press a pad against a disc when the piston is subjected to a first force along a first axis in a direction directed from the piston toward the pad. The device is notable in that it comprises a first plate inserted between a first surface of the piston and the pad and designed to generate a second force along the first axis in a direction directed from the pad toward the piston when said pad is caused to move as a result of rotation of the disc.

It is then the potential energy of movement of the vehicle that is used to apply the brake still more firmly. No additional source of energy internal to the braking system is required.

According to the embodiment chosen, the first plate comprises a second surface comprising at least one first line a variable distance away from a plane parallel to said first surface, and the device comprises an element designed to move along said line of the second surface when said pad is made to move as a result of rotation of the disc so that said element moves closer to said first surface; the element is a ball; a second plate comprises a third surface comprising at least one second line a variable distance from a plane parallel to said second surface; said first surface has, passing through it, a rod that has an end designed to follow the movement of the piston when said piston is subjected to said first force along the first axis in a direction oriented from the piston toward the pad, and to be immobilized by a key so as to press the pad against the disc when said piston is no longer subjected to said first force and/or said second force is applied against said end of the rod or alternatively, said second force is applied against said first surface of the piston; said first plate delimits at least one space with oblique boundaries such that pad movement caused by the rotation of the disc tends to increase the separation between said oblique boundaries; said first force is generated by hydraulic fluid pressure applied to the piston; a washer combined with the rod 11 allows the rod to be driven when the washer is subjected to said first force.

BRIEF DESCRIPTION OF THE DRAWINGS

The invention will be better understood upon reading the description which will follow, given solely by way of example and made with reference to the drawings in which.

DETAILED DESCRIPTION

Figure 1:
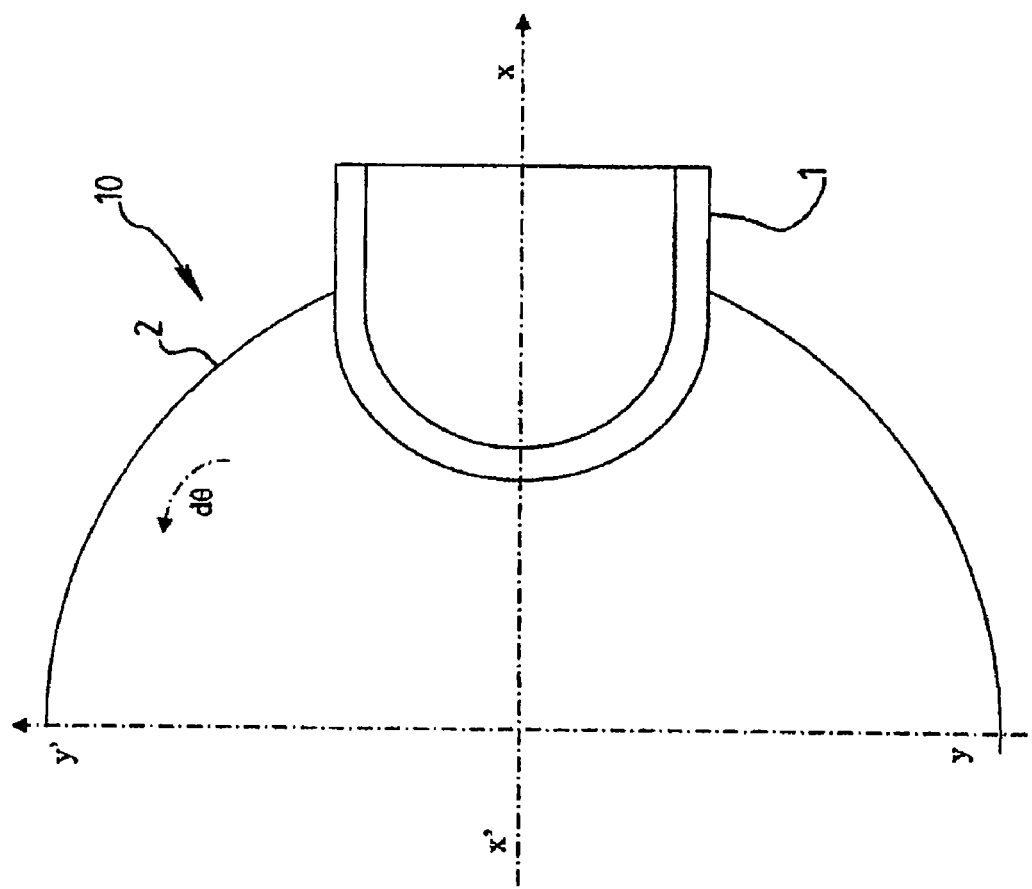
FIG. 1 comprises, on the right, a head-on half view of a disc brake device and, on the left, a view of the brake device in section.
Figure 1:
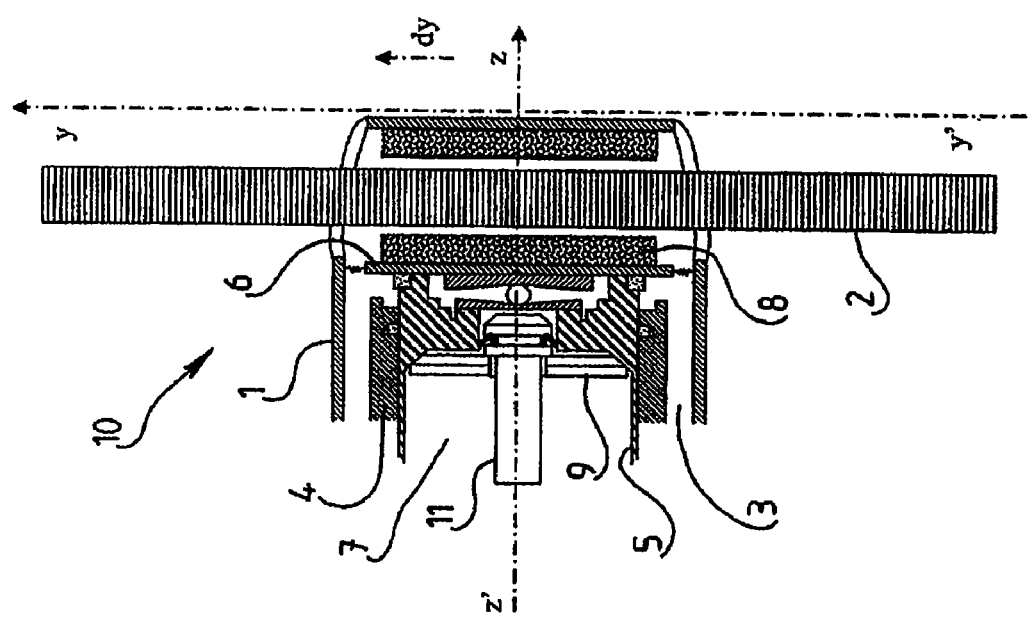

With reference to FIG. 1, a disc-type parking brake device for a motor vehicle is denoted by the general reference 10.

The example of FIG. 1 corresponds to a floating-caliper disc brake, with caliper 1, that also acts as a main service brake.

The caliper 1 has a blind bore 3 in which there is housed a hydraulic cylinder 4 containing a fluid for pressing against a piston 5. When subjected to the pressure of the fluid, the piston 5 presses against a shoe 6 to press a pad 8 against a disc 2.

In the sectioned view of the left-hand side of FIG. 1 it may be seen that the piston 5 itself comprises a chamber 7 the side walls of which slide in the cylinder 4 and a front face of which is subjected to a first force along a first axis z'z in a direction oriented from the piston toward the pad, and the modulus of which is equal to the product of the raised pressure multiplied by the cross section of the chamber 7. The arrangement that has thus been described allows the pad 8 to be pressed against the disc 2 when the raised pressure over atmospheric pressure, in the chamber 7, is positive.

As may be seen from the head-on half view of the device in the right-hand part of FIG. 1, an angle of rotation dθ of the disc results in a movement dy projected onto an axis y'y perpendicular to the axis z'z.

Figure 2:
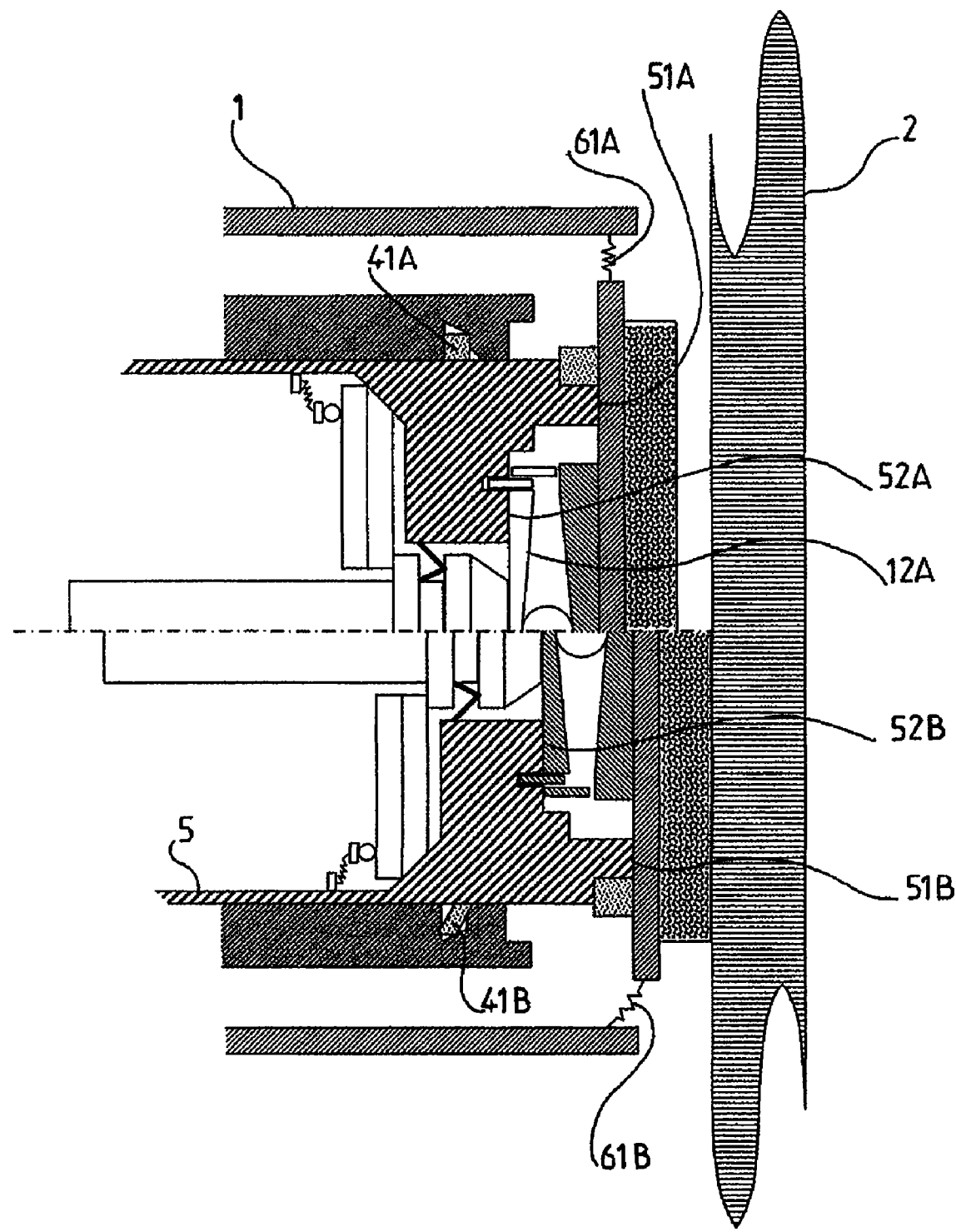
FIG. 2 comprises two half sections each corresponding to a different position of the brake device.

FIG. 2 recreates the sectioned view of the left-hand part of FIG. 1 depicting, in its upper part, the piston in its initial position and, in its lower part, the piston in its pressing position when there is a raised pressure in the chamber 7.

A flexible annular seal 41 positioned in a groove of the cylinder 4 ensures sealed contact with the side wall of the piston 5. The annular seal is identified as 41A in its initial position and as 41B in its deformed position as a result of the forward movement of the piston.

The front face of the piston 5 comprises an annular surface 51 identified as 51A when initially in contact with the shoe 6 without applying pressure. The annular surface 51 is identified as 51B when it is in contact with the shoe 6, applying pressure.

The front face of the piston 5 also comprises an annular surface 52 which, being set back from the surface 51, is not in contact with the shoe 6 but is in contact with a face of a plate 12 inserted between the surface 52 of the piston 5 and the pad 8. An opposite face of the plate 12 defines a surface 121 comprising a line at a variable distance from a plane parallel to the surface 52. This line is, for example, the slope of a ramp which begins near the plane parallel to the surface 52 in the vicinity of the axis z'z and diverges from this plane in the direction away from the axis z'z. To give another example, this line is the generatrix of a cone of which the vertex on the axis z'z is close to the plane parallel to the surface 52 and of which the base, centered on the axis z'z, is distant from the plane.

The shoe 6 is fixed to the caliper 1 by an elastic means 61, identified as 61A in its position of rest and as 61B in its work position, in this particular instance elongated in order to follow the movement of the shoe 6 subjected to a pressure force from the piston.

The flexible seal 41 and the elastic means 61 apply a return force when there is a raised pressure in the chamber 7, so as to press the pad 8 against the disc 2. In use as a service brake, that is to say to slow a vehicle driving at non-zero speed, this return force brings the piston back into its initial position when the raised pressure disappears, thus eliminating the braking force applied by the pad 8 to the disc 2.

Figure 3:
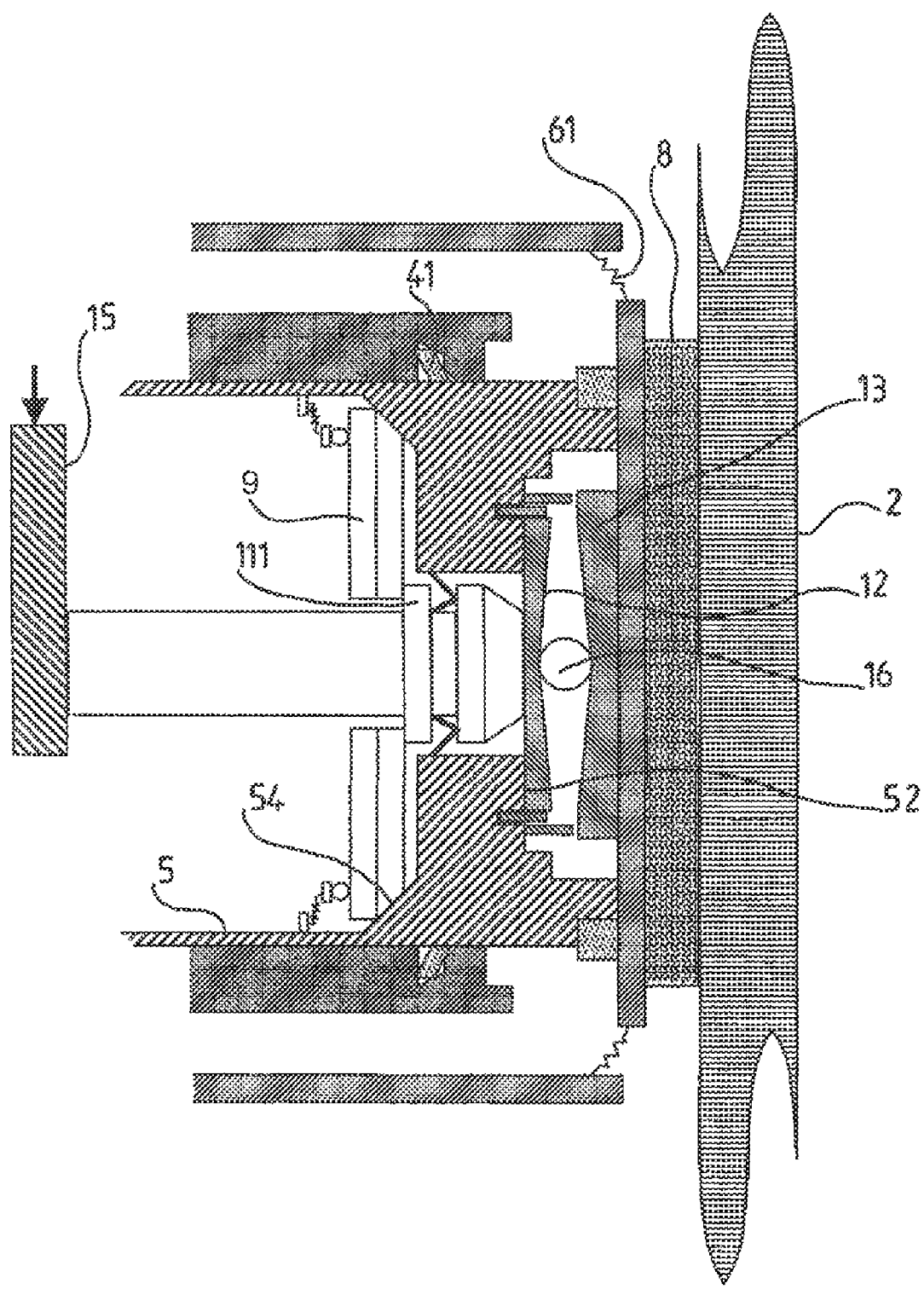
FIG. 3 is a view in section of the brake device in a brake-applied position.

FIG. 3 depicts the brake in the brake-applied position, particularly with vehicle stationary. What we are now concerned with is use of the device as a parking brake. With the vehicle stationary, a raised pressure is created in the chamber 7, for example by means of the brake pedal, and a control, not depicted here, which acknowledges the user's desire to use the parking brake functionality is actuated, for example by maintaining the pressure once the brake pedal has been released or in a different way. However, maintaining the pressure, even if this can be done without fail, is not always enough to maintain a braking force that guarantees complete immobilization of the vehicle, for example on a steep slope.

The phenomenon is now explained with reference to FIG. 4. If the brake is hot when it is applied as a parking brake, the caliper 1, the cylinder 4 and/or the piston 5, or even the fluid in the chamber 7, may have expanded under the effect of temperature. This expansion at the time of application of the parking brake is then a factor that contributes toward contraction of the piston as the temperature falls again.

Figure 4:
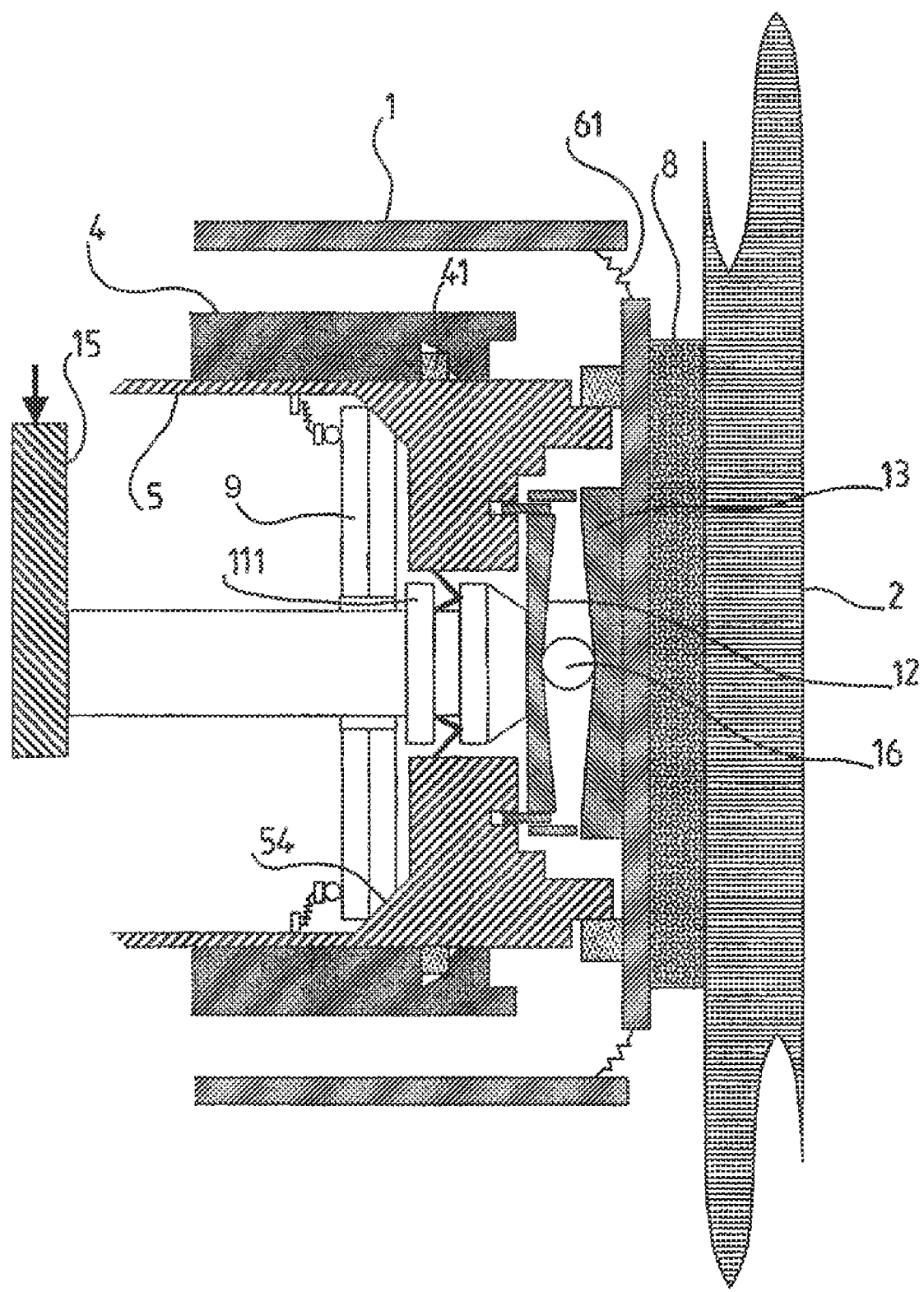
FIG. 4 is a view in section showing how the force with which the brakes are applied changes over time.

This contraction is depicted in the amplified form in FIG. 4 where, with the pad 8 secured to the shoe 6 being pressed against the disc 2, contraction of the piston causes loss of contact between the surface 51 and the shoe 6. This has the effect of relaxing the force with which the piston 5 is pressed against the shoe 6 and therefore of relaxing the force with which the pad 8 is applied to the disc 2. As long as no external force, for example the weight of the vehicle on a slope or a thrust from some other factor, does not attempt to move the vehicle, the phenomenon is of no concern. However, this phenomenon becomes troublesome if the vehicle starts to move when the parking brake is applied.

In order to prevent the vehicle from moving when the parking brake is applied, the plate 12, inserted between the surface 52 and the pad 8, is designed to generate a force along the axis z'z in a direction oriented from the pad toward the piston when the pad 8 is subjected to a movement as a result of rotation of the disc 2. In this way, a surface against which this force is applied causes, through reaction, an increase in the intensity with which the pad 8 is pressed against the disc 2, thus immediately re-immobilizing the vehicle.

The self-adjusting effect mentioned hereinabove is obtained through an element 16 designed to move along the line of the surface 121 when the pad 8 is subjected to a movement as a result of rotation of the disc 2. The line of the surface 121, which begins near the plane parallel to the surface 52 in the vicinity of the axis z'z and diverges from this plane in the direction away from the axis z'z, causes the element 16 to become pinched if, for example, the element 16 accompanies the infinitesimally small movement of the pad 8.

A self-adjusting effect can also be obtained with a plate 13 inserted between the surface 52 of the piston 5 and the pad 8, with a first face of the plate 13 secured to the shoe 6 and a second face opposite to the first face which defines a surface 131 comprising a line a variable distance away from the plane parallel to the surface 52, of a geometry similar to that of the surface 121.

The element 16 is then designed to move along the line of the surface 131 when the pad 8 is subjected to a movement brought about by rotation of the disc 2, without necessarily accompanying the movement of the pad 8, because it is then the surface 131 which follows the infinitesimally small movement of the pad 8.

A combined use of the plates 12 and 13 means that a ball can be selected to perform the functionalities of the element 16. The advantage of a ball, held captive in the space between the two plates but free to rotate, is that it encourages pinching without slippage. A reduction in friction is beneficial in reducing part wear.

Figure 6:
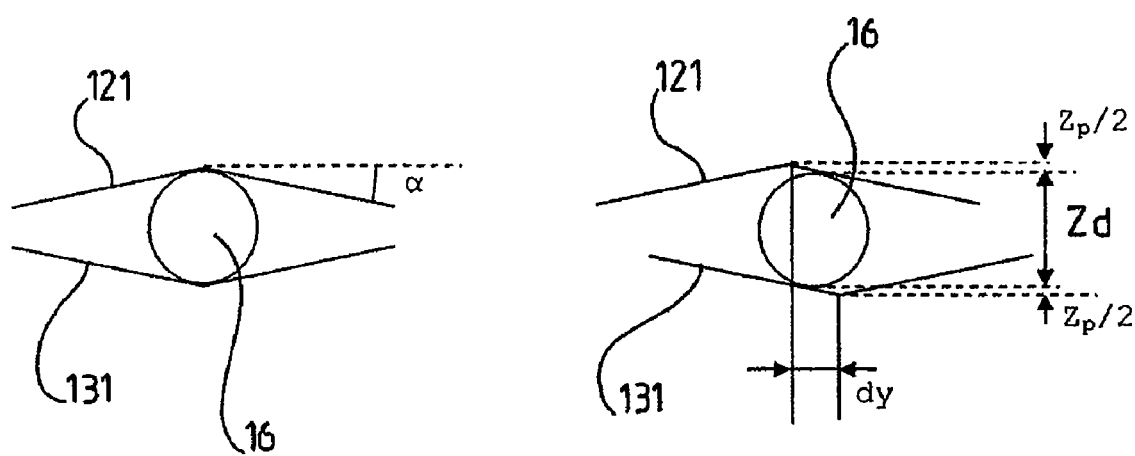
FIG. 6 is a diagram serving to explain the invention.

With reference to FIG. 6, the left-hand part depicts the element 16 in the form of a ball, initially captive between the surfaces 121 and 131 which define a space of magnitude $Z_d$ substantially equal to the diameter of the ball. When the surfaces 121 and 131 become offset from one another, it may be seen from the right-hand part of FIG. 6 that there is an increase $Z_p$ in the space such that $Z_p = dy \cdot \tan \alpha$ where $\alpha$ is the angle of the slope of the surface 121 assumed to be equal to the angle of the slope 122.

Figure 5:
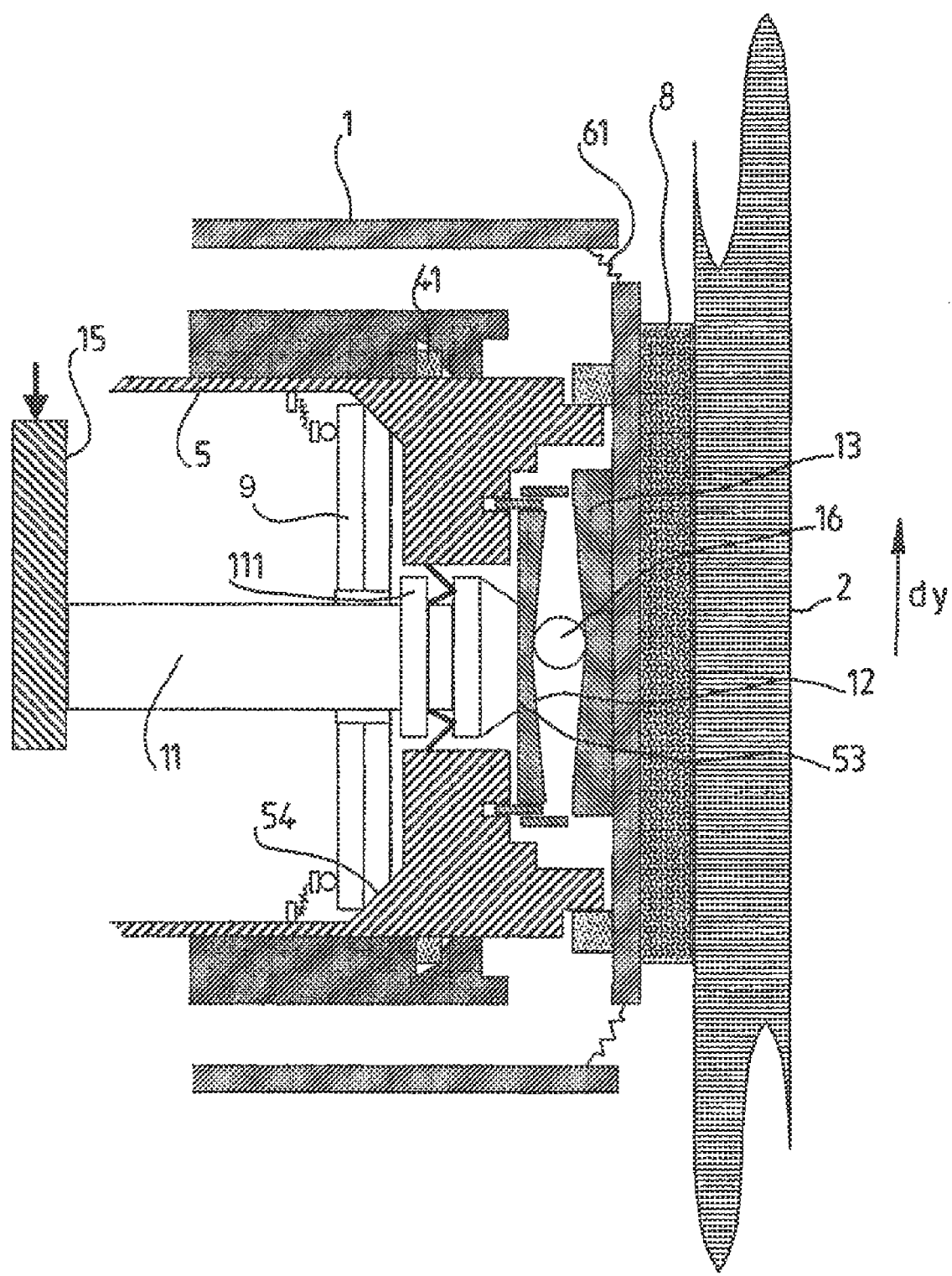
FIG. 5 is a view in section showing the technical effect of the invention.

With reference to FIG. 5, an infinitesimally small movement dy of the pad 8 brought about by the braking forces applied to the disc 2, causes a similar movement of the plate 13, upward in the case illustrated by FIG. 5. The technical effect that has just been explained with reference to FIG. 6 forces the plate 12 against an end 53 of the rod 11 which, through reaction, increases the pressure with which the pad 8 is pressed against the disc 2 and once again immobilizes the vehicle in spite of the contraction of the piston 5. In fact, because the contraction of the piston 5 is gradual as the temperature drops and because the parts have low compressibility as a result of their being made of metal, an imperceptible movement dy causes the disc to be reimmobilized almost immediately. We shall explain the functionalities of the rod 11 with reference once more to FIG. 3.

In the absence of a rod 11, the technical effect explained with reference to FIG. 6 forces the plate 12 against the surface 52 which, through reaction, increases the pressure with which the pad 8 is pressed against the disc 2 and once again immobilizes the vehicle in spite of the contraction of the piston 5, provided that the contraction of the piston 5 is not too excessive.

Returning to FIG. 3, the surface 52 has, passing through it, a rod 11 that has an end 53 designed to follow the movement of the piston 5 when the piston is subjected to the force along the axis z'z generated by a hydraulic fluid pressure applied to the piston. The rod 11 comprises a flange 111 against which there rests a washer 9 pierced at its center with a diameter that allows the rod 11 but not the flange 111 to pass through. The washer 9 is also pressed against one face 54 of the piston 5, inside the chamber 7, so that an increase in pressure in the chamber 7 causes identical movements of the piston 5 and of the rod 11, particularly of its end 53, in a direction directed from the piston toward the pad.

A key 15 can then be used to immobilize the rod 11 in such a way as to press the pad 8 against the disc 2 when the piston is no longer subjected to all of the force generated by the raised hydraulic fluid pressure.

As can be seen in FIG. 4, even if a drop in pressure in the chamber 7 causes the piston to contract, the end 53 of the rod 11 continues to press the pad 8 against the disc 2.

As can be seen in FIG. 5, even if the rod 11 had expanded at the time that the key 15 was brought into position to act as a parking brake, the space with oblique boundaries delimited by the plate 12 and, better still, with the plate 13, contains at least one section of separation equal to the diameter of the element 16 in the form of a ball. Thus, when a movement of the pad resulting from a rotation of the disc 2 causes the shoe 6 to move and therefore causes one of the oblique boundaries to move relative to the other, this movement of the oblique boundaries tends to increase their mutual separation. This increase in separation reestablishes the pressure with which the end 53 of the rod 11 is in contact with the plate 12 and, through successive knock-on effects, reestablishes the pressure with which the pad 8 presses against the disc 2.

The invention claimed is:

1. A disc brake device comprising a piston (5) pressing a pad (8) against a disc (2) when said piston is subjected to a first force along a first axis (z'z) in a direction directed from the piston toward the pad, characterized in that the device comprises a first plate (12) inserted between a first surface (52) of the piston (5) and said pad (8) and a second plate (13) between the first plate (12) and said pad (8), the device generating a second force along said first axis (z'z) in a direction directed from the pad toward the piston when said pad (8) is caused to move as a result of rotation of the disc (2), and in that the surface (52) has, passing through it, a rod (11) that has an end (53) following the movement of the piston (5) when said piston is subjected to said first force along the first axis (z'z) in a direction oriented from a piston toward the pad, and to be immobilized by a key (15) so as to press the pad (8) against the disc (2) when said piston is no longer subjected to said first force, the first plate (12) and the rod (11) being arranged such that the second force, when generated, is applied by the first plate (12) to the rod (11).

2. A device according to claim 1, characterized in that said first plate (12, 13) comprises a second surface (121, 131) comprising at least one first line a variable distance away from a plane parallel to said first surface (52), and in that the device comprises an element (16) designed to move along said line of the second surface when said pad (8) is made to move as a result of rotation of the disc (2) so that said element (16) moves closer to said first surface (52).

3. A device according to claim 2, characterized in that said element (16) is a ball.

4. A device according to claim 3, characterized in that the device comprises a second plate (13, 12) which comprises a third surface (131, 121) comprising at least one second line a variable distance from a plane parallel to said second surface (121, 131).

5. A device according to claim 2, characterized in that the device comprises a second plate (13, 12) which comprises a third surface (131, 121) comprising at least one second line a variable distance from a plane parallel to said second surface (121, 131).

6. A device according to claim 2, characterized in that the element (16) is axially between the end (53) of the rod (11) and the pad (8).

7. A device according to claim 1, characterized in that said second force is applied against said end of the rod (11).

8. A device according to claim 7, characterized in that said second force is applied against said first surface (52) of the piston (5).

9. A device according to claim 8, characterized in that said first plate delimits at least one space with oblique boundaries such that pad movement caused by the rotation of the disc (2) tends to increase the separation between said oblique boundaries.

10. A device according to claim 9, characterized in that said first force is generated by hydraulic fluid pressure applied to the piston.

11. A device according to claim 7, characterized in that the device comprises a washer (9) combined with the rod (11) so as to drive the rod (11) when the washer (9) is subjected to said first force.

12. A device according to claim 1, characterized in that said second force is applied against said first surface (52) of the piston (5).

13. A device according to claim 1, characterized in that said first plate delimits at least one space with oblique boundaries such that pad movement caused by the rotation of the disc (2) tends to increase the separation between said oblique boundaries.

14. A device according to claim 1, characterized in that said first force is generated by hydraulic fluid pressure applied to the piston.

15. A device according to claim 1, characterized in that the device comprises a washer (9) combined with the rod (11) so as to drive the rod (11) when the washer (9) is subjected to said first force.

16. A device according to claim 1, characterized in that the first plate (12) has a surface facing toward and engageable with the first surface (52) of the piston (5), and in that the end (53) of the rod (11) engages the surface of the first plate (12).

17. A device according to claim 1, characterized in that the rod (11) has a second end opposite the end (53), and in that the key (15) engages the second end of the rod (11) to immobilize the rod (11).

18. A disc brake device comprising a piston (5) pressing a pad (8) against a disc (2) when the piston is subjected to a first force along a first axis (z'z) in a direction directed from the piston (5) toward the pad (8), characterized in that the device comprises a first plate (12) between a first surface (52) of the piston (5) and the pad (8), a second plate (13) between the first plate (12) and the pad (8), and an element (16) between the first plate (12) and the second plate (13), at least one of the first plate (12) and the second plate (13) comprising a second surface (121, 131) comprising at least one line a variable distance away from a plane parallel to the first surface (52), the element (16) moving along the line of the second surface (121, 131) when the pad (8) is made to move as a result of rotation of the disc (2) so that the element (16) moves closer to the first surface (52) to thereby generate a second force along the first axis (z'z) in a direction directed from the pad toward the piston, in that the first surface (52) has, passing therethrough, a rod (11) that has an end (53) following the movement of the piston (5) when the piston is subjected to the first force along the first axis (z'z) in a direction oriented from a piston toward the pad, and to be immobilized by a key (15) so as to press the pad (8) against the disc (2) when the piston is no longer subjected to the first force, and in that the first plate (12) has an opposite surface facing toward and engageable with the first surface (52) of the piston (5), the end (53) of the rod (11) engaging the opposite surface of the first plate (12).

19. A device according to claim 18, characterized in that the element (16) is axially between the end (53) of the rod (11) and the pad (8).

20. A device according to claim 18, characterized in that the first plate (12) comprises a second surface (121) comprising at least one first line a variable distance away from a plane parallel to said first surface (52), in that the element (16) moves along said line of the second surface when said pad (8) is made to move as a result of rotation of the disc (2) so that said element (16) moves closer to said first surface (52), and in that the second plate (13) comprises a third surface (131) comprising at least one second line a variable distance from a plane parallel to said second surface (121, 131).

* * * * *